United States Patent [19]

Schmidt

[11] 3,883,726

[45] May 13, 1975

[54] REDUNDANT FAST FOURIER TRANSFORM DATA HANDLING COMPUTER

[75] Inventor: Ralph Otto Schmidt, Santa Ana, Calif.

[73] Assignee: Interstate Electronics Corporation, Anaheim, Calif.

[22] Filed: May 18, 1973

[21] Appl. No.: 361,533

Related U.S. Application Data

[63] Continuation of Ser. No. 182,685, Sept. 22, 1971, abandoned.

[52] U.S. Cl. ................................ 235/152; 324/77 B

[51] Int. Cl. ............................................ G06f 15/34

[58] Field of Search ........... 235/152, 156; 324/77 R, 324/77 B, 77 D; 179/1 SA

[56] References Cited

UNITED STATES PATENTS 3,541,458 11/1970 Klund ............................ 235/152 X

OTHER PUBLICATIONS

A. V. Oppenheim, "Speech Spectrograms Using the FFT" *IEEE Spectrum* Aug. 1970, pp. 57–62.

*Primary Examiner*—Eugene G. Botz
*Assistant Examiner*—David H. Malzahn
*Attorney, Agent, or Firm*—Knobbe, Martens, Olson, Hubbard & Bear

[57] ABSTRACT

Special purpose data handling equipment is utilized with a fast Fourier transform algorithm computer. The equipment buffers input data such that each block of input data includes data from the immediately preceding and following data blocks. This input redundancy is useful when input data is processed through a data window which attenuates data at the beginning and end of the data block, since, when this data is transformed and subsequently inversely transformed, simple addition of the output data points removes the effect of the attenuating window.

8 Claims, 12 Drawing Figures

INVENTOR
RALPH O. SCHMIDT

BY
FOWLER, KNOBBE & MARTENS
ATTORNEYS.

INVENTOR
RALPH O. SCHMIDT

BY
FOWLER, KNOBBE & MARTENS
ATTORNEYS.

INVENTOR.
RALPH O. SCHMIDT
BY
FOWLER, KNOBBE & MARTENS
ATTORNEYS.

INVENTOR.
RALPH O. SCHMIDT
BY
FOWLER, KNOBBE
& MARTENS
ATTORNEYS.

REDUNDANT FAST FOURIER TRANSFORM DATA HANDLING COMPUTER

RELATED APPLICATION

This is a continuation of application Ser. No. 182,685, Sept. 22, 1971, now abandoned.

BACKGROUND OF THE INVENTION

A. Fourier Analysis

The frequency domain characteristics of a time domain waveform provide a powerful analytical tool in a variety of technical disciplines. The Fourier analysis of a given periodic function represents it as a sum of a number, usually infinite, of simple harmonic components. Because the response of a linear dynamic system to a simple harmonic input is usually easy to obtain, the response to an arbitrary periodic input can be obtained from its Fourier analysis. Likewise, the field of spectrum analysis, by providing a frequency domain representation of a waveform, facilitates identification of unknnown waveforms.

B. The Fourier Transform

The Fourier transform, which is defined as follows:

$$1.\ A(f)=\int_{-\infty}^{\infty} X(t)e^{-i2\pi ft}\,dt$$

$$2.\ X(t)=\frac{1}{2\pi}\int_{-\infty}^{\infty} A(f)e^{i2\pi ft}\,df$$

WHERE:

$A(f)$=THE FREQUENCY DOMAIN FUNCTION $X(t)$=THE TIME DOMAIN FUNCTION $i=\sqrt{-j}$ is a common mathematical tool for deriving the frequency domain function from a given time domain function and vice versa, i.e., given a particular mathematical function which defines the amplitude variations of a waveform with time, equation (1) above may be utilized to determine the various frequency components of the time domain function. The Fourier transform depends upon the underlying realization that any periodic amplitude function in the time domain may be constructed by superimposing a variety of sine and cosine functions in the time domain, each of these functions having a predetermined amplitude.

Early attempts to mechanize the Fourier transform utilized analog techniques which consisted primarily of the application of a time domain waveform to a series of bandpass filters, such that the response from each of the filters as indicative of the amplitude of the frequency domain components of the time domain function within a given frequency band width. Because of the requirement for a large number of filters, in order to cover a broad over-all pass band while maintaining the pass bands of the individual filters reasonably narrow, such techniques were notable for their high equipment cost. These costs were reduced through the use of a number of analog techniques, including the reiteration of a given time sample through a single bandpass filter, while changing the center frequency of the filter for each iteration, thereby allowing one filter to selectively sample for a plurality of frequency components. This reiteration, however, required additional time, and the input waveform could be sampled only once during each of the relatively long reiteration periods.

C. The Discrete Fourier Transform

Early attempts to use digital techniques for determining the frequency domain function corresponding to a time domain waveform utilized the discrete Fourier transform which allows frequency domain components to be derived from a set of periodic discrete amplitude samples of an input time domain waveform. These techniques were likewise limited to a periodic sampling of the input waveform, but the speed of digital calculation allowed a reduction of the sampling period from that required by analog techniques. The analogous discrete Fourier transform pair that applies to sampled versions of the functions given in equations (1) and (2) can be written in the following form:

$$3.\ A(r)=\frac{1}{N}\sum_{k=0}^{N-1} X(k)e^{\left(\frac{i2\pi rk}{N}\right)}$$

$$4.\ X(k)=\sum_{r=0}^{N-1} A(r)e^{\left(\frac{i2\pi rk}{N}\right)}$$

WHERE:

$A(r)$=THE $r^{th}$ COEFFICIENT OF THE FREQUENCY DOMAIN FUNCTION $X(k)$=THE $k^{th}$ COEFFICIENT OF THE TIME DOMAIN FUNCTION

Since the discrete Fourier transform samples must be taken during a predetermined time period, the input time domain waveform is assumed to be periodic in the time domain, and to have a period which is equal to the sampling time, i.e., the errors introduced by truncating the time domain waveform are assumed to be negligible. In fact, these errors are often not negligible, and numerous techniques have been utilized to diminish the effect of the time domain truncation, such as the superimposition upon the time domain samples of a cosine-squared function, which is commonly termed "hanning", in order to smooth the transition into and out of the time sampling period.

In order to accomplish the discrete Fourier transform of equation (3) or the inverse discrete Fourier transform of equation (4), the equations (3) and (4) require $N^2$ computations, each computation including a multiplication and an addition. For a reasonably precise transform, such as one where N=2048, the computations exceed 4,000,000, and therefore either an excessive amount of hardware is necessary, or an unreasonably long time is required to complete the computation if the same hardware handles successive computations.

D. The Fast Fourier Transform Algorithm

A fast Fourier transform algorithm was derived by J. W. Cooley and J. W. Tukey and initially published in *Mathematics of Computation*, volume 19, pages 297 to 301, April, 1965. This algorithm recognizes the similarities in a number of the $N^2$ multiply and add computations of the discrete Fourier transform, and utilizes these similarities to reduce the total number of computations required to calculate the discrete Fourier transform. By using the fast Fourier transform algorithm outlined by J. W. Cooley and J. W. Tukey, the computations are reduced from $N^2$ operations to $N/(2)_N \log_2 N$ complex multiplications, $N/(2) \log_2 N$ complex additions, and N/(2) $\log_2 N$ complex subtractions. For N=2,048, for example, this represents a computational reduction of more than 400 to 1 over the direct discrete Fourier transform computations.

SUMMARY OF THE INVENTION

The present invention involves special purpose data handling equipment which is utilized when attenuated input data windows are used with a fast Fourier transform computer to change the characteristics of the filters sinthesized by the computer. This equipment, by redundantly inputting to the computer certain input data, allows the effects of the attenuated input data window to be easily removed.

DETAILED DESCRIPTION OF THE PREFERRED EMBODIMENT

A. The Fast Fourier Transform Algorithm

Figure 1:
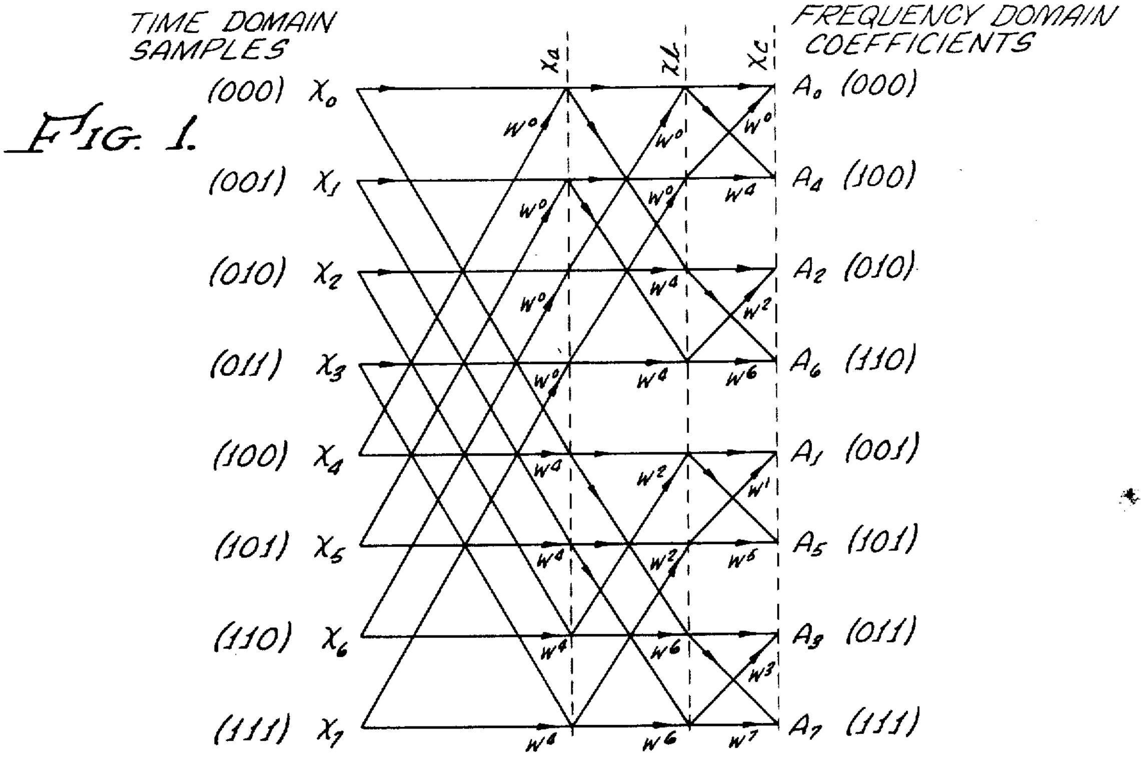
FIG. 1 is a computational flow chart for the normal ordered Fast Fourier Transform algorithm where N=8.

In 1965 a paper was published by J. W. Cooley and J. W. Tukey which described in algorithm for rapidly calculating the discrete Fourier transform. This algorithm was adaptable to digital computation of the transform, and reduced the discrete Fourier transform of equations (3) and (4) to a series of sums. The derivation of this algorithm is briefly described as follows: By defining:

5. $W=e(i2\pi/N)$ equations (3) and (4) become:

$$6.\ A(r)=\frac{1}{N}\sum_{k=0}^{N-1} X(k)W^{-rk}$$

$$7.\ X(k)=\sum_{k=0}^{N-1} A(r)W^{-rk}$$

WHERE:

$r=0,1,\ldots,N-1$ $k=0,1\ldots,N-1$

It should be noted that the discrete Fourier transform expression is complex, and that it is therefore possible to transform two series of time samples simultaneously, treating one of these series as the real part and one of the series as the imaginary part of the complex expression. It is likewise possible to transform 2N samples with the expression defined in equations (3) and (4) by handling the even numbered samples as the real part of the complex transform and the odd numbered samples as the imaginary portion of the complex transform. Thus, for example, a 2048 point transform can be performed as a 1024 point (N=1024) complex transform.

When $r$ and $k$ are defined using binary notation, and when, for example, N equals 8, $r$ and $k$ can be defined as follows:

8. $r=4r_2+2r_1+r_o$

9. $k=4k_2\quad 2k_1+k_o$

WHERE:

$r=0,1,\ldots,7$ $k=0,1,\ldots,7$ $r_2, r_1, r_o, k_2, k_1, k_o=0$ OR 1 ONLY

This definition will, of course, change as the value of N changes. For example, for N=64, $r=32r_5+16r_4+8r_3+4r_2+2r_1+r_0$.

Using this notation for N=8, equation (6) becomes:

$$10.\ A(r_2,r_1,r_0)=\frac{1}{N}\sum_{k_2=0}^{1}\sum_{k_1=0}^{1}\sum_{k_0=0}^{1} X(k_2,k_1,k_0)W^{(4r_2+2r_1+r_0)(4k_2+2k_1+k_0)}$$

SINCE:

$W^{(Z+Y)}=W^ZW^Y$ equation (10) may be written as follows:

$$11.\ A(r_2,r_1,r_0)=\frac{1}{N}\sum_{k_0=0}^{1}\sum_{k_1=0}^{1}\sum_{k_2=0}^{1} X(k_2,k_1,k_0)W^{(4r_2+2r_1+r_0)4k_2}W^{(4r_2+2r_1+r_0)2k_1}W^{(4r_2+2r_1+r_0)k_0}$$

The individual terms of equation (11) can be written in the following form:

12. $W^{(4r_2+2r_1+r_0)4k_2} = [W^{8(2r_2+r_1)k_2}]W^{4r_0k_2}$

13. $W^{(4r_2+2r_1+r_0)2k_1} = [W^{8(r_2)k_1}]W^{(2r_1+r_0)2k_1}$

14. $W^{(4r_2+2r_1+r_0)k_0} = W^{(4r_2+2r_1+r_0)k_0}$

Note, however, that due to the definition of W in equation (5),

15. $[e^{(-2\pi i/8)}]^8 = e^{-2\pi i} = 1$

Thus, the bracketed portions of equation (12) and (13) can be replaced by a one. It should be noted that, as N changes, equation 15 will change, but that a number of terms of the equations will equal 1 regardless of the value of N. Therefore, equation (10) can be written in the following form:

$$16.\quad A(r_2,r_1,r_0) = \underbrace{\frac{1}{N}\sum_{k_0=0}^{1} \underbrace{\sum_{k_1=0}^{1} \underbrace{\sum_{k_2=0}^{1} X(k_2,k_1,k_0)W^{4r_0k_2}}_{X_a} W^{(2r_1+r_0)2k_1}}_{X_b} W^{(4r_2+2r_1+r_0)k_0}}_{X_c}$$

In this form, each of the summations can be separately performed, and only the results of the last summation must be saved. Thus, equation (10) can be performed as the series of successive summations shown below:

$$17.\quad X_a = \sum_{k_2=0}^{1} X(k_2,k_1,k_0)W^{4r_0k_2}$$

$$18.\quad X_b = \sum_{k_1=0}^{1} X_a W^{(2r_1+r_0)2k_1}$$

$$19.\quad X_c = \frac{1}{N}\sum_{k_0=0}^{1} X_b W^{(4r_2+2r_1+r_0)k_0}$$

$$20.\quad A(r_2,r_1,r_0) = \hat{X}_c$$

Where X$a$ is the first summation, X$b$ is the second summation and X$c$ is the third summation. These three successive summations or passes serve to compute the value of A ($r$) when N is equal to 8. In a similar manner, greater numbers of successive summations will compute the value of A($r$) for larger values of N. For example, when N=1024, ten successive summations will compute the value of A($r$).

Figure 2:
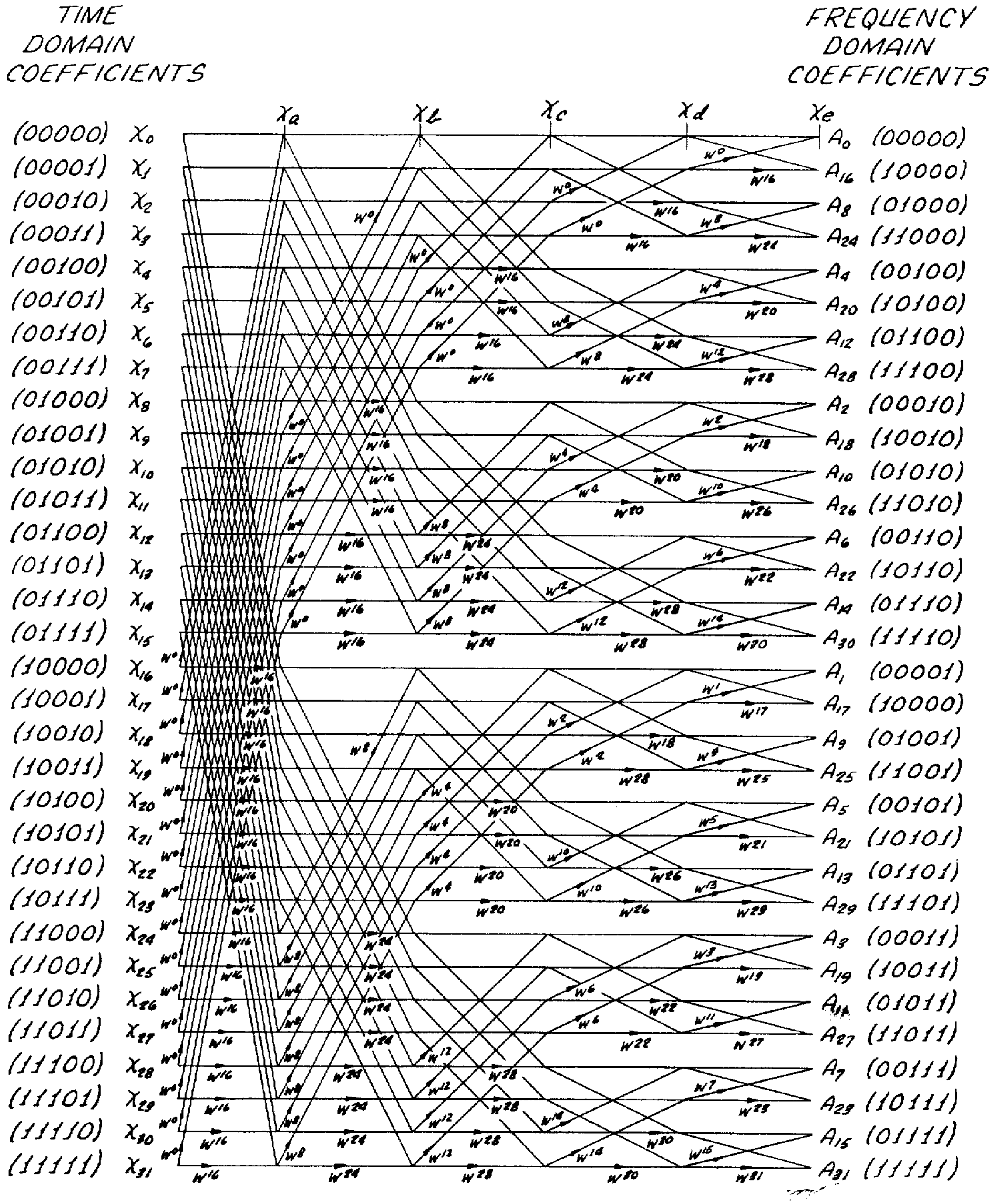
FIG. 2 is a computational flow chart for the normal ordered Fast Fourier Transform algorithm where N=32.

The summations shown in equations 17 through 19 are diagrammed in FIG. 1 wherein $X_0$ through $X_7$ denote periodic consecutive time sample pairs corresponding to the amplitude of a function to be transformed. The first time sample of each pair is treated as the real part of the complex coefficient while the second sample is treated as the imaginary part. These coefficients correspond to binary notation coefficients 000 through 111, as shown in FIG. 1. The first summation, X$a$, requires $k_2$ to change from 0 to 1, so that periodic time coefficients which are 4 samples, or N/2, apart are summed. The results of the first summation appear as binary coefficients along the line $X_a$ in FIG. 1. Successive summations $X_b$ and $X_c$, in turn, require $k_1$ and $k_0$, respectively, to change from 0 to 1, so that coefficients resulting from the previous summation which are 2 coefficients, or N/4; and one coefficient, or N/8, apart, respectively, are summed. The results of the summations $X_b$ and $X_c$ appear as binary coefficients along the lines $X_b$ and $X_c$ in FIG. 1. Regardless of the value of N, the first summation will always involve the combination of samples which are N/2 samples apart, the second summation N/4 apart, and so on, until enough passes have been completed so that adjacent coefficients are combined. For example, FIG. 2 shows that for N=32, samples which are 16, 8, 4, 2 and 1 apart are combined, so that five successive summations are required for N=32. As shown in FIG. 1, the binary coefficients of A($r$) are not reordered, as shown in equation (20); rather, the output frequency domain coefficients in FIG. 1 occur as ordered in equations (19), i.e. in reverse binary order from $A_0$ to $A_7$, or, in binary notation, from 000 to 111. Similarly, the output coefficients in FIG. 2 occur in reverse binary order from 00000 to 11111. Reverse binary order is defined as the order achieved when the order of the binary digits of words in normal sequential order is reversed, i.e., 110 becomes 011, so that for N=8, the third coefficient appears where the sixth coefficient would appear if the order were normal, or for N=32, 01100 (12) becomes 00110 (6).

The W notation in FIGS. 1 and 2 denotes the power to which W is raised for each of the calculations involved in the summations $X_a$, $X_b$ and $X_c$. Thus, in FIG. 1, it can be seen that for the production of the first binary coefficient of $X_a$, the complex coefficient $X_0$ is combined with the complex coefficient $X_4$ after the coefficient $X_4$ is multiplied $W^0$. similarly, for the production of the frequency domain coefficient $A_2$, the third coefficient of $X_b$ is combined with the fourth coefficient of $X_b$ multiplied by $W^2$. It should be noted that each time a pair of coefficients is combined to produce a new pair of coefficients, the combination requires a complex multiplication, a complex addition, and a complex subtraction. For example, in the combination of input coefficients $X_0$ and $X_4$ to produce the first and fifth coefficients of $X_a$, $X_0$ is combined with $X_4$ multiplied by either $W^0$ or $W^4$. From equation (5), when N=8, $W^0$ is the negative of $W^4$, so that it is necessary to multiply $X_4$ x $W^0$ only once, and then add and subtract the product from $X_0$ to produce the two coefficients of $X_a$. This negative relationship holds true for $W^1=-W^5$, $W^2=-W^6$ and $W^3=-W^7$, when N=8. Similarly, in FIG. 2, when N=32, $W^0=-W^{16}$, $W^1=-W^{17}$, $W^2=-W^{18}$, etc.

Section B. Reverse Binary Order Algorithm

Figure 3:
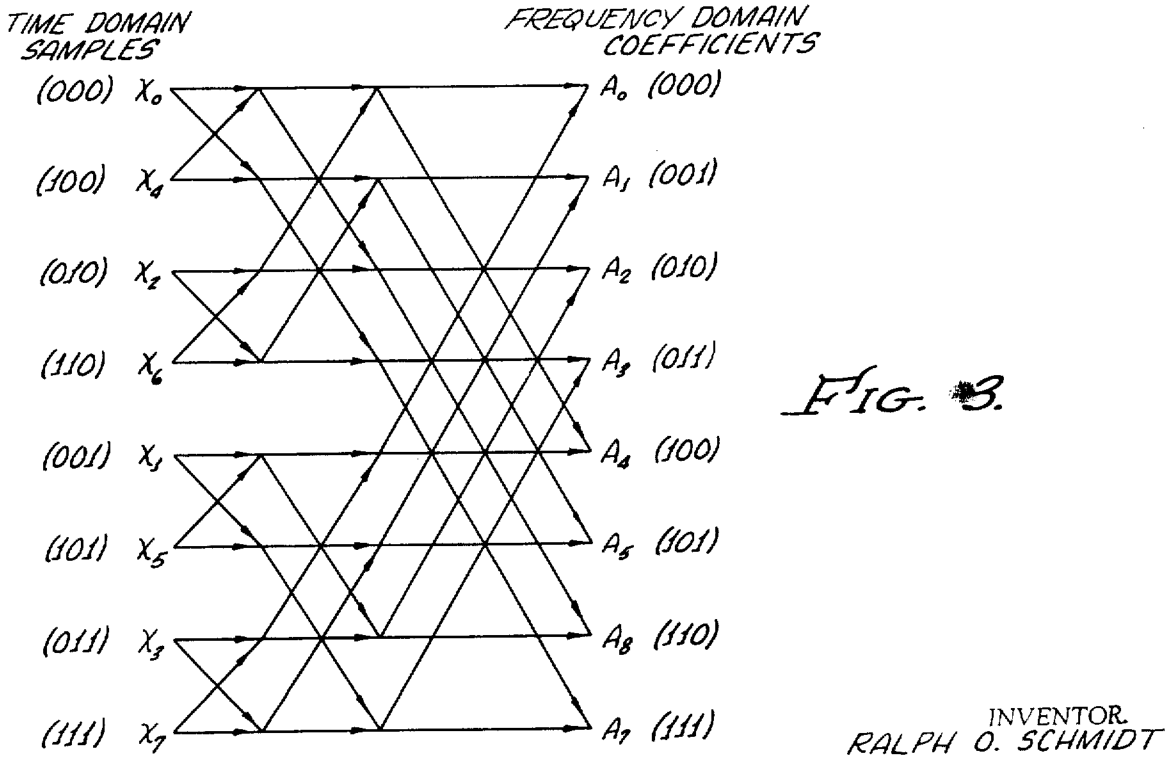
FIG. 3 is a computational flow chart for the reverse ordered Fast Fourier algorithm where N=8.

FIG. 3 shows the computational flow diagram for the algorithm explained above wherein the input samples are in inverse binary order rather than the normal order.

It can be seen that when the input samples are in reverse binary order, the first summation or pass of the algorithm requiring samples which are separated by four coefficients when N=8, appear adjacent one another. Therefore, the first pass in the algorithm utilizing reverse binary ordered input coefficients, combines adjacent samples. Similarly, the second pass combines samples which are separated by two coefficients and the last pass to produce $X_r$ combines samples which are four coefficients apart, these being adjacent coefficients in a normal ordered pattern. The algorithm of FIGS. 1 and 3 are identical, and the actual calculations which are carried out combine the same coefficients. The only thing which has been changed is the order in which the input coefficients appear. It will be noted from FIG. 3 that when the input data samples are in reverse binary order, the output appears in normal order. For this reason, input data is often transformed, mathematical equations are conducted on the reverse-ordered frequency coefficients and the newly computed frequency coefficients are inversely transformed to create new time-domain coefficients showing the effect of the frequency domain calculations. It can be seen from the similarity of equations 3 and 4 above that the format required for the application of the inverse transform is identical to that for the forward transform. The calculation of the inverse transform on the reverse binary ordered frequency coefficients therefore results in time domain coefficients in normal binary order.

Figure 4A:
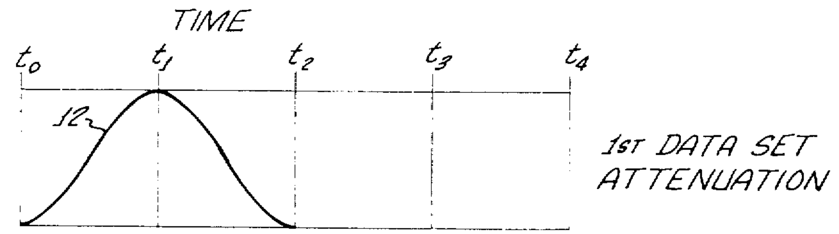
FIGS. 4*a* through 4*d* are plots showing attenuation of various data samples with time using a cosine squared formation.
Figure 4B:
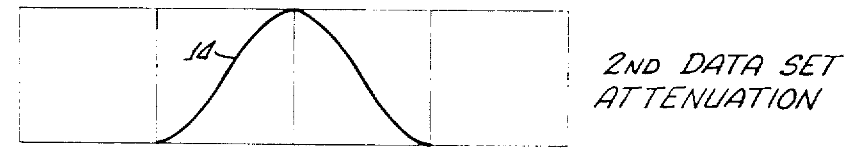
Figure 4C:
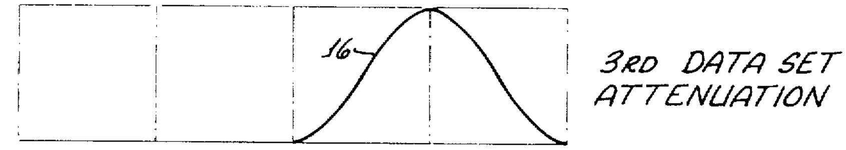

As noted above, in order to enhance the characteristics of the filters which are simulated in the Fourier transform and to simultaneously decrease the production of unwanted frequency domain characteristics due to the sampling of data during a discrete time window rather than over an infinite period of time, it has been found advantageous to attenuate data at the initiation and conclusion of each time window by various formulae. One such formula, and the one utilized in the preferred embodiment of the present invention, is the square of a cosine having a period equal to the time window. This cosine squared function is superimposed on the input data samples, as shown in FIGS. 4*a* through 4*c*, so that samples in the center of the window are not attenuated, but samples are attenuated to a greater degree toward the extremity of the time window.

Although such an attenuation scheme, often referred to as hanning, produces the desired results indicated above, it will be readily understood that when data is transformed into its frequency coefficients, and later inversely transformed to produce time domain coefficients, these calculated time domain coefficients will include the effects of the initial attenuation. Therefore, it has been the custom to multiply such calculated time domain coefficients by the inverse of the attenuating waveform, thereby creating the opposite effect of the initial attenuation and resulting in meaningful time domain coefficients.

The present invention alleviates the necessity of multiplying calculated time domain coefficients by an inverse waveform through the use of special data handling procedures which result in the calculation of meaningful time domain coefficients by the inverse fast Fourier transform algorithm itself.

C. Data Handling Method

The redundant data handling technique of the present invention is best described in reference to FIG. 4 which shows a plot of one type of attenuation curves which may be applied to input time domain samples prior to Fourier transform analysis. In the example shown in FIG. 4, each data set to be transformed is attenuated using an identical attenuation curve, the attenuation curve 12 being a hanning curve, or cosine squared curve, plotted against time. This attenuation curve is applied to a complete block of input time domain samples which are to be used as a complete data set for the calculation of a Fast Fourier Transform. Thus, for example, if an eight point transform is to be conducted, the time T-0 through T-2 in FIG. 4*a* will be the time required for eight real time samples to be measured from the input waveform which is being sampled and applied to the input of the Fast Fourier analysis computer. The first and last of these samples are attenuated to a greater extent than is a sample in the middle of the data set so that a cosine squared function is superimposed upon the data set. When such attenuation was performed in the past, it was common to utilize, as the next data set, the input coefficients which appear between times T-2 and T-4, again superimposing upon these time samples an attenuation curve. The present invention, however, stores the latter half of the time samples in the first data set; that is, those time samples which were monitored between times T-1 and T-2, and utilizes these data samples as the initial half of the data samples for a second data set, which is shown in FIG. 4*b* as attenuated by an attenuation factor 14. The latter half of the data samples in this second data set; that is, those samples monitored between times T-2 and Times T-3, become, in turn, the initial half of a third data set which, as shown in FIG. 4*c*, is attenuated by the factor 16.

It can be seen from FIGS. 4*a* through 4*c* that, for a cosine squared function, each data sample is utilized as an input sample for the Fast Fourier Computer twice, and that the data which formed the second half of one data set will form the first half of the next succeeding data set.

Figure 4D:
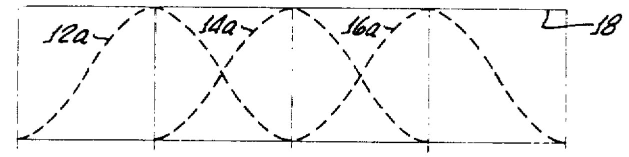

With reference to the curves 12*a*, 14*a* and 16*a* of FIG. 4*d*, it can be seen that, if these curves are superimposed and added together, a constant unattenuated curve 18 will result. Since, as mentioned above, the output time domain samples which result from a Fast Fourier Transform followed by an inversed Fast Fourier Transform will show the effects of the initial attenuation the simple superimposition of the output time domain samples in the manner shown in FIG. 4*d* will result in a set of unattenuated time domain coefficients. Thus, for example, when the cosine squared function is used as the attenuating factor, it is possible to produce unattenuated output samples by adding the coefficients which form the latter half of each output data set to the coefficients which form the initial half of samples of the next succeeding data set so that each final output sample results from the addition of two output time domain samples from the Fast Fourier Transform computer. All data is therefore redundantly calculated, which redundant handling, by the addition techniques described, removes the effects of the superimposed data windows. To clarify the superimposition which must be performed as this case where N=8, and the attenuation curve is a hanning curve, data samples $X_4$, $X_5$, $X_6$ and $X_7$ (FIG. 1) of one data set will form the input data samples $X_0$, $X_1$, $X_2$ and $X_3$, respectively, of the next succeeding data set, with the data samples $X_4$, $X_5$, $X_6$ and $X_7$ of that next succeeding data set being formed by new input data. If these data sets are transformed using the fast Fourier algorithm, and subsequently inversely transformed to produce a first coefficient set having coefficients $X'_0$ through $X'_7$, and a second coefficient set having coefficients $X''_0$ through $X''_7$; $X'_4$, $X'_5$, $X'_6$ and $X'_7$ will be added to $X''_0$, $X''_1$, $X''_2$ and $X''_3$, respectively, to produce output coefficients without the effect of the initial attenuation curve.

Figure 5A:
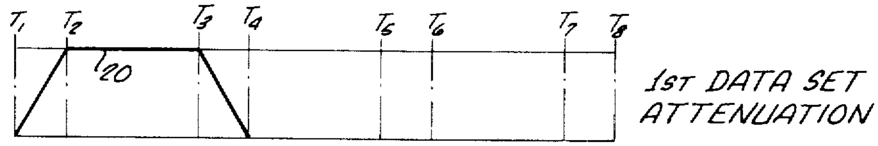
FIGS. 5*a* through 5*d* are plots showing attenuation of various data samples with time using a trapezoidal attenuation formation.
Figure 5B:
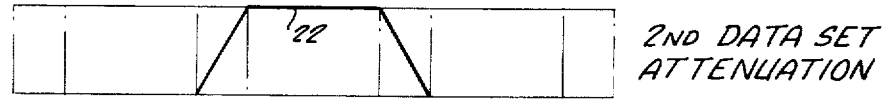
Figure 5C:
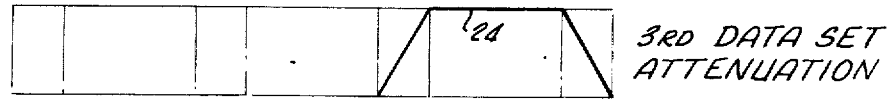
Figure 5D:
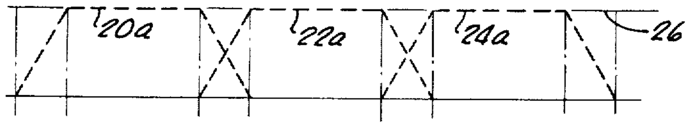

FIGS. 5*a* through 5*d* show the attenuation curves 20, 22 and 24 for a trapezoidal window. In this instance, it can be seen that the total data set is not redundantly handled but only the attenuated portions thereof. That is, only those data samples which occur between times T-3 and T-4 of FIGS. 5*a* and 5*b* or between times T-5 and T-6 of FIGS. 5*b* and 5*c* are redundantly handled, since no attenuation is applied to the samples which occur between times T-4 and T-5 of FIG. 5*b*, for example. It is therefore only necessary to overlap the samples at the output of the Fast Fourier Transform computer by a time identical to the time between T-3 and T-4 to produce an unattenuated data sample level as shown by the curve 26 in FIG. 5*d*. It is therefore clear that the amount of redundancy which is required for a particular data attenuation curve will depend on the attenuation curve itself, but that many attenuation curves will lend themselves to a particular percentage of redundancy which will alleviate all of the effects of the attenuation.

D. System Block Diagram

Figure 6:
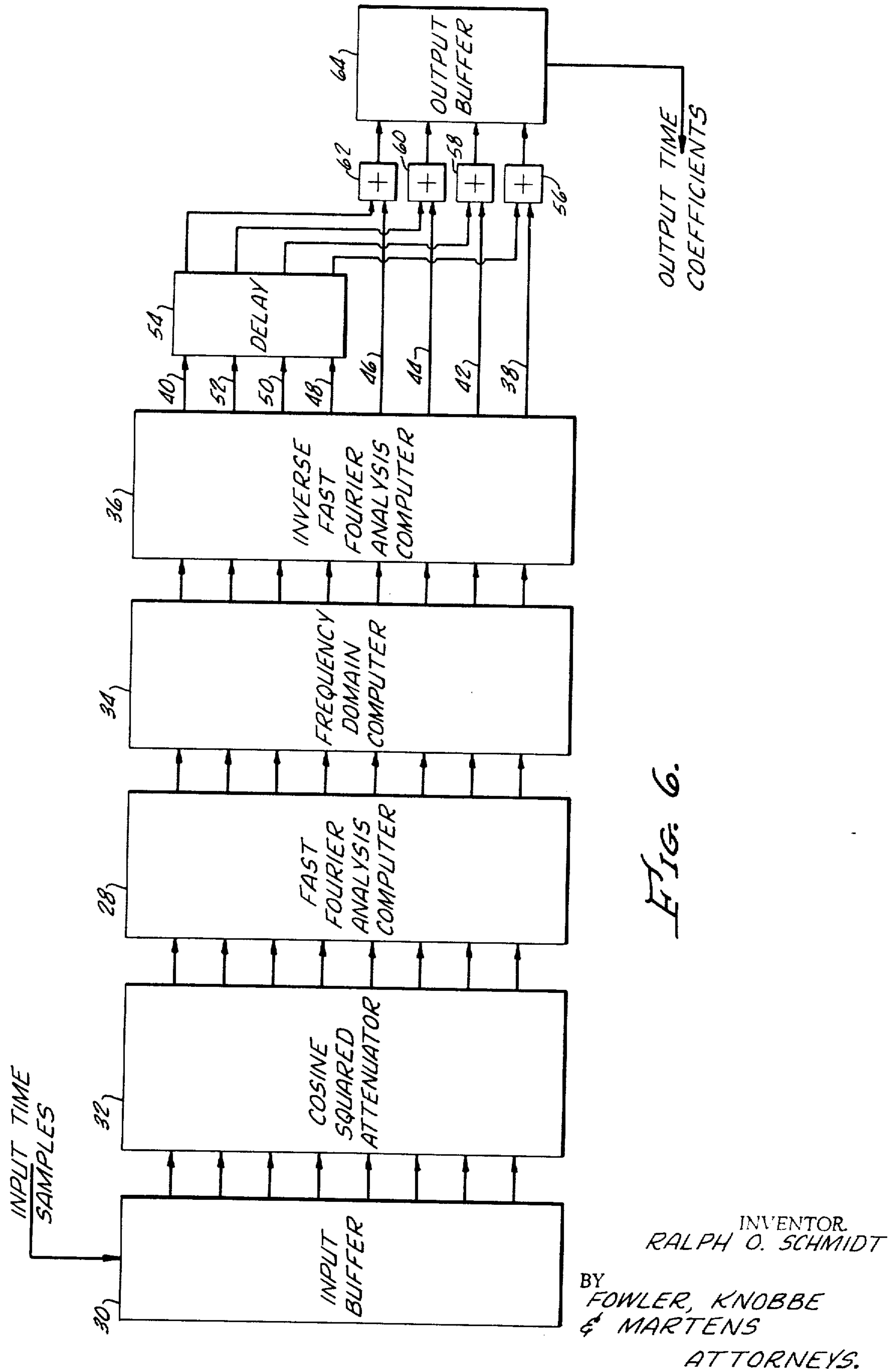
FIG. 6 is a block diagram of a data handling system for redundantly handling data in accordance with the present invention.

Referring now to FIG. 6, a block diagram of the preferred embodiment computer system is shown. Although the preferred embodiment conducted a 1,024 point transform, for ease of illustration, FIG. 6 shows an eight point Fast Fourier transform computer 28 which accomplishes the calculations diagrammed in FIG. 1. Input data is sampled in serial form from an input waveform and is applied to an input buffer 30. When a complete data set is available at the input buffer 30 (8 data samples in this example), such as the data which appears between times T-0 and T-2 of FIG. 4*a*, the input buffer 30 is accessed in parallel to a cosine squared attenuator 32. This attenuator superimposes the cosine squared curve such as the curve 12 of FIG. 4*a* on the input data samples. These attenuated data samples are then addressed to the Fast Fourier Analysis computer 28. The output of the Fast Fourier Analysis computer, as described above, is in reverse binary order. It is customary when doing analysis upon sampled time domain data to conduct certain calculations on the frequency domain coefficients in their reverse binary order. This is accomplished, in the preferred embodiment, by a frequency domain computer 34. An example of the calculations which may be performed by the frequency domain computer 34 is a superimposition of the frequency domain coefficients with the characteristics of a filter whose frequency domain characteristics are known.

The output of the frequency domain computer 34 is then applied to an inverse fast Fourier Analysis computer 36 which converts the frequency domain coefficients back to time domain coefficients. The output of the inverse Fast Fourier Analysis computer 36, as described above, is in normal binary order, with the initial time domain coefficient appearing on line 38 and the final time domain coefficient appearing on line 40. The lines 42 through 52 carry the six time domain coefficients which result from the intermediate input time domain coefficients monitored between times T-0 and T-2 in FIG. 4*a*.

In order to superimpose the latter half of these time domain coefficients; that is, coefficients appearing on lines 48, 50, 52 and 40 with the initial half of the coefficients in the next succeeding data set; that is, the data samples on lines 38, 42, 44 and 46, the lines 48, 50, 52 and 40 are applied to a delay 54. The delay 54 delays each of the input coefficients by the time required to access one half of a complete data set; that is, a time equal to the difference between T-1 and T-2 of FIG. 4*a*. The output of the delay 54 is then applied to a series of adders 56, 58, 60 and 62 to which are likewise applied the undelayed coefficients on the lines 38, 42, 44 and 46. These adders 58 and 62 superimpose the delayed time domain coefficients from the delay 54 which represent the latter half of a previous data set with the undelayed coefficients on lines 38, 42, 44 and 46 which represent the initial half of a succeeding data set, thus resulting in the unattenuated set of coefficients as shown by the curve 18 in FIG. 4*d*.

These output coefficients from the adders 56–62 are then applied to an output buffer 64 which allows serial accessing of the output data for display or other use.

As will be readily recognized, the number of samples which are applied to the delay 54 as well as the time duration of the delay 54, will depend upon the particular attenuation function which is used. Thus, if the trapezoidal attenuation function shown in FIGS. 5*a* through 5*d* is utilized, the delay 54 will be applied to fewer than half of the output time domain data sets and will be of a duration which is equal to the difference between times T-3 and T-4 of FIG. 5*a*.

Using this invention, it is therefore possible, without applying an inverse attenuation curve to the calculated time domain coefficients, to remove the effects of the time domain data sampling attenuation by redundantly handling a predetermined portion of the input time domain samples.

I claim:

1. A system for transforming input time domain data samples, comprising:

a buffer responsive to said input time domain samples for combining said input time domain samples into data sets, selected ones of said input time domain samples being combined into more than one data set;

an attenuator responsive to said data sets produced in said buffer for attenuating certain of said input time domain samples of said data sets to produce attenuated output data sets;

a first computer receiving said attenuated output data sets for performing calculations on said output data sets according to the Cooley-Tukey fast Fourier transform algorithm to produce frequency domain coefficients;

a second computer coupled to said first computer for performing calculations on said frequency domain coefficients according to the reverse Cooley-Tukey fast Fourier transform algorithm to produce time domain coefficients; and means responsive to said second computer for combining said coefficients to remove from said coefficients the effects of said attenuator.

2. A system for transforming input time domain data samples as defined in claim 1 wherein said means for removing the effects of said attenuator additionally comprises:

means coupled to the output of said second computer for delaying a selected plurality of said time domain coefficients to produce delayed coefficients.

3. A system for transforming input time domain data samples as defined in claim 2 wherein said means for removing the effects of said attenuator additionally comprises:

a plurality of adding means, each having an input from said delay means and an input from said second computer, said means adding selected ones of said time domain coefficients to selected ones of said delayed time domain coefficients.

4. A method of handling the input and output data of a fast Fourier analysis computer, said computer capable of manipulating input time domain data in data sets to produce output frequency domain coefficients in data sets in accordance with a fast Fourier transform algorithm, and said computer capable of manipulating input frequency domain coefficients in data sets to produce output time domain coefficients in data sets in accordance with an inverse fast Fourier transform algorithm, comprising:

accessing a series of input time domain signal samples for said computer;

delaying said series of input time domain signal samples into first data sets, each data set including the data for one fast Fourier transform, each data set including a plurality of input time domain signal samples which are also included in another of said data sets;

attenuating said first data sets in accordance with a predetermined waveform to produce attenuated data sets;

conducting said attenuating data sets to said computer after said attenuating step as said input time domain data in data sets, so that said computer will produce said output frequency domain coefficients in data sets in accordance with a fast Fourier transform algorithm;

conducting said output frequency domain coefficients in data sets to said computer as said input frequency domain data in data sets, so that said computer will produce said output time domain coefficients in data sets in accordance with an inverse fast Fourier transform algorithm;

delaying a portion of said output time domain coefficients in each of said time domain coefficient data sets resulting from said inverse transform; and combining selected output time domain coefficients and selected ones of said portion of said output time domain coefficients after said delaying step, said dividing and combining steps effecting a removal of the effects of said attenuation.

5. A method of handling a series of input time domain signal samples in a computer, comprising the steps of:

A. selecting a set of N of said input time domain samples;

B. superimposing an attenuation function on said set of N input time domain signal samples to produce attenuated signal samples;

C. transforming said attenuated signal samples to produce frequency domain coefficients from said samples in accordance with a forward fast Fourier transform algorithm;

D. transforming said frequency domain coefficients to produce time domain coefficients in accordance with an inverse fast Fourier transform algorithm;

E. selecting an additional set of N of said input time domain samples, said additional set of N including a plurality of input time domain samples which are also included in said set of N input time domain samples selected in step (A);

F. repeating steps ((B), (C) and (D), utilizing the set of N input time domain samples selected in step (E); and G. combining selected time domain coefficients produced in step (D) with selected time domain coefficients produced in step (F) to remove the effects of said attenuation function.

6. A system for calculating the discrete Fourier transform of a plurality of serial input time domain samples to produce output frequency domain coefficients $\{A(r)\}$ and for calculating the inverse discrete Fourier transform comprising:

a buffer responsive to said serial input time domain samples for storing said serial input time domain samples, said buffer outputting said serial input time domain samples in a series of data sets each comprising N input time domain samples, each successive data set of said series including a plurality of input time domain samples which are also included in the next succeeding data set in the data set series;

an attenuator connected to receive the output sets of data from said buffer, said attenuator superimposing an attenuation waveform upon said sets of data from said buffer to produce a series of attenuated data sets having attenuated time domain samples $\{X(k)\}$;

a computer responsive to said attenuator for combining said data sets of N attenuated time domain samples in accordance with the equation $$X(k)$$

$$A(r) = \frac{1}{N} \sum_{k=0}^{N-1} X(k) e^{\left(\frac{i2\pi rk}{N}\right)}$$

to produce a series of sets of N output frequency domain coefficients $\{A(r)\}$;

means for superimposing upon said sets of N frequency domain coefficients $\{A(r)\}$ a predetermined frequency characteristic to produce sets of N frequency domain coefficients $\{A'(r)\}$;

a second computer responsive to said means for superimposing for combining said data sets of N frequency domain coefficients $\{A'(r)\}$ in accordance with the equation $$X'(k) = \sum_{r=0}^{N-1} A'(r) e^{\left(\frac{i2\pi rk}{N}\right)}$$

to produce a series of sets of N output time domain coefficients $\{X'(k)\}$; and means coupled to said second computer and receiving said series of sets of N output time domain coefficients $\{X'(k)\}$ for removing the effects of said attenuator from said series of sets of N output time domain coefficients $\{X'(k)\}$.

7. A system as defined in claim 6 wherein said means for removing comprises means for combining certain coefficients of each of said series of sets of N coefficients $\{X'(k)\}$ with certain coefficients to different sets of N coefficients $\{X'(k)\}$.

8. A system as defined in claim 6 wherein said means for removing comprises:

a second buffer responsive to said second computer for delaying selected ones of said time domain coefficients $\{X'(k)\}$ to produce selected delayed time domain coefficients $\{X''(k)\}$ of each of said sets of N output time domain coefficients $\{X'(k)\}$; and means responsive to said second computer and said second buffer for adding selected one of said delayed time coefficients $\{X''(k)\}$ of each of said sets of N output time domain coefficients $\{X'(k)\}$ with selected ones of said output time domain coefficients $\{X'(k)\}$ of the next succeeding set of N output time domain coefficients $\{X'(k)\}$ to remove the effect of said attenuator.

* * * * *